(12) United States Patent
Kawaguchi et al.

(10) Patent No.: US 10,748,715 B2
(45) Date of Patent: Aug. 18, 2020

(54) ENERGY STORAGE DEVICE AND METHOD FOR MANUFACTURING SAME

(71) Applicant: GS Yuasa International Ltd., Kyoto (JP)

(72) Inventors: Kazuki Kawaguchi, Kyoto (JP); Akihiko Miyazaki, Kyoto (JP); Sumio Mori, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 16 days.

(21) Appl. No.: 16/095,613

(22) PCT Filed: Apr. 25, 2017

(86) PCT No.: PCT/JP2017/016344
§ 371 (c)(1),
(2) Date: Oct. 22, 2018

(87) PCT Pub. No.: WO2017/188235
PCT Pub. Date: Nov. 2, 2017

(65) Prior Publication Data
US 2019/0131080 A1    May 2, 2019

(30) Foreign Application Priority Data
Apr. 26, 2016 (JP) ................. 2016-088075

(51) Int. Cl.
H01G 11/24       (2013.01)
H01G 11/70       (2013.01)
(Continued)

(52) U.S. Cl.
CPC ............. *H01G 11/24* (2013.01); *H01G 11/28* (2013.01); *H01G 11/70* (2013.01); *H01G 11/86* (2013.01);
(Continued)

(58) Field of Classification Search
None
See application file for complete search history.

(56) References Cited

U.S. PATENT DOCUMENTS

2006/0127773 A1*  6/2006  Kawakami ............ H01M 4/134
                                                                         429/245
2007/0184352 A1    8/2007  Donoue
(Continued)

FOREIGN PATENT DOCUMENTS

JP    2007213961 A    8/2007
JP    2008060060 A    3/2008
(Continued)

OTHER PUBLICATIONS

International Search Report dated Jul. 25, 2017 filed in PCT/JP2017/016344.

*Primary Examiner* — Dion Ferguson
(74) *Attorney, Agent, or Firm* — Rankin, Hill & Clark LLP

(57) ABSTRACT

An energy storage device is provided in which a decrease in power caused by repetitive charge-discharge in a high-temperature environment is suppressed. In the present embodiment, an energy storage device and a method for manufacturing the energy storage device are provided, the energy storage device including an electrode which includes: an active material layer including a particulate active material; and a conductive layer layered on the active material layer and including a conduction aid. An average secondary particle diameter of the active material is 2.5 μm or more and 6.0 μm or less. A surface roughness Ra of the conductive layer on a side on the active material layer is 0.17 μm or more and 0.50 μm or less.

6 Claims, 8 Drawing Sheets

(51) Int. Cl.
  *H01G 11/28* (2013.01)
  *H01G 11/86* (2013.01)
  *H01M 4/139* (2010.01)
  *H01M 4/66* (2006.01)
  *H01M 4/13* (2010.01)

(52) U.S. Cl.
  CPC ............ *H01M 4/13* (2013.01); *H01M 4/139* (2013.01); *H01M 4/66* (2013.01); *H01M 4/661* (2013.01)

(56) References Cited

U.S. PATENT DOCUMENTS

| | | | |
|---|---|---|---|
| 2008/0286655 A1* | 11/2008 | Inoue | H01M 4/136 429/231.95 |
| 2009/0257171 A1 | 10/2009 | Yamazaki | |
| 2013/0071722 A1* | 3/2013 | Yuasa | H01M 4/64 429/158 |
| 2014/0255796 A1* | 9/2014 | Matsuoka | H01M 4/0445 429/339 |
| 2015/0213967 A1 | 7/2015 | Yokouchi | |
| 2016/0322635 A1* | 11/2016 | Kubota | C01B 25/45 |
| 2016/0336593 A1 | 11/2016 | Honda | |
| 2017/0104204 A1* | 4/2017 | Zhamu | H01M 4/0416 |
| 2017/0149100 A1* | 5/2017 | Ishii | H01M 2/024 |
| 2017/0244097 A1* | 8/2017 | Ose | H01M 4/136 |
| 2017/0331146 A1* | 11/2017 | Haba | H01M 4/13 |

FOREIGN PATENT DOCUMENTS

| | | |
|---|---|---|
| JP | 2008160053 A | 7/2008 |
| JP | 2012079821 A | 4/2012 |
| JP | 2012084612 A | 4/2012 |
| JP | 2013058451 A | 3/2013 |
| JP | 2013065482 A | 4/2013 |
| JP | 2014067592 A | 4/2014 |
| JP | 2014116317 A | 6/2014 |
| JP | 5608990 B2 | 10/2014 |
| JP | 5625007 B2 | 11/2014 |
| JP | 2015088465 A | 5/2015 |
| JP | 2015197991 A | 11/2015 |
| JP | 2016186882 A | 10/2016 |
| WO | 2015111189 A1 | 7/2015 |
| WO | 2015111194 A1 | 7/2015 |

* cited by examiner

ENERGY STORAGE DEVICE AND METHOD
FOR MANUFACTURING SAME

TECHNICAL FIELD

The present invention relates to an energy storage device such as a nonaqueous electrolyte secondary battery, and a method for manufacturing the energy storage device.

BACKGROUND ART

Conventionally, a nonaqueous electrolyte secondary battery has been known that includes a positive electrode, a negative electrode, a nonaqueous electrolyte, and a separator.

Known as this kind of battery is a battery that includes a positive electrode having: a positive current collector; and a positive composite layer that is formed on the positive current collector and contains a positive active material, the positive current collector being formed of a metal foil and a conductive layer that is formed on a surface of the metal foil and contains carbon fine particles (for example, Patent Document 1). In the battery disclosed in Patent Document 1, the porosity of the positive composite layer is 25 to 40% and the average particle diameter of the positive active material is 10 µm or less.

The battery disclosed in Patent Document 1 sometimes decreases power by repetitive charge-discharge in a high-temperature environment.

PRIOR ART DOCUMENT

Patent Document

Patent Document 1: JP-A-2015-088465

SUMMARY OF THE INVENTION

Problems to be Solved by the Invention

An object of the present embodiment is to provide an energy storage device that suppresses a decrease in power caused by repetitive charge-discharge in a high-temperature environment, and a method for manufacturing the energy storage device.

Means for Solving the Problems

An energy storage device according to this embodiment includes: an electrode which including: an active material layer including a particulate active material; and a conductive layer layered on the active material layer and including a conduction aid. An average secondary particle diameter of the active material is 2.5 µm or more and 6.0 µm or less. A surface roughness Ra of the conductive layer on a side on the active material layer is 0.17 µm or more and 0.50 µm or less, and a density of the active material layer is 1.6 g/cm³ or more and 2.8 g/cm³ or less.

In the above-mentioned energy storage device, the active material layer and the conductive layer can be sufficiently in contact with each other. Therefore, an increase in internal resistance of the energy storage device caused by peeling of the active material layer from the conductive layer due to repetitive charge-discharge in a high-temperature environment can be suppressed. Accordingly, in the above-mentioned energy storage device, a decrease in power is suppressed that is caused by repetitive charge-discharge in a high-temperature environment.

A mass per unit area of the conductive layer may be 0.1 g/m² or more and 1.0 g/m² or less.

A method for manufacturing an energy storage device according to this embodiment includes: preparing an electrode by layering an active material layer including a particulate active material and a conductive layer including a conduction aid. An average secondary particle diameter of the active material is 2.5 µm or more and 6.0 µm or less. A surface roughness Ra of the conductive layer on a side on the active material layer is set at 0.17 µm or more and 0.50 µm or less, and a density of the active material layer is set at 1.6 g/cm³ or more and 2.8 g/cm³ or less.

Advantages of the Invention

According to the present embodiment, an energy storage device can be provided, in which a decrease in power that is caused by repetitive charge-discharge in a high-temperature environment is suppressed.

MODE FOR CARRYING OUT THE INVENTION

Figure 1:
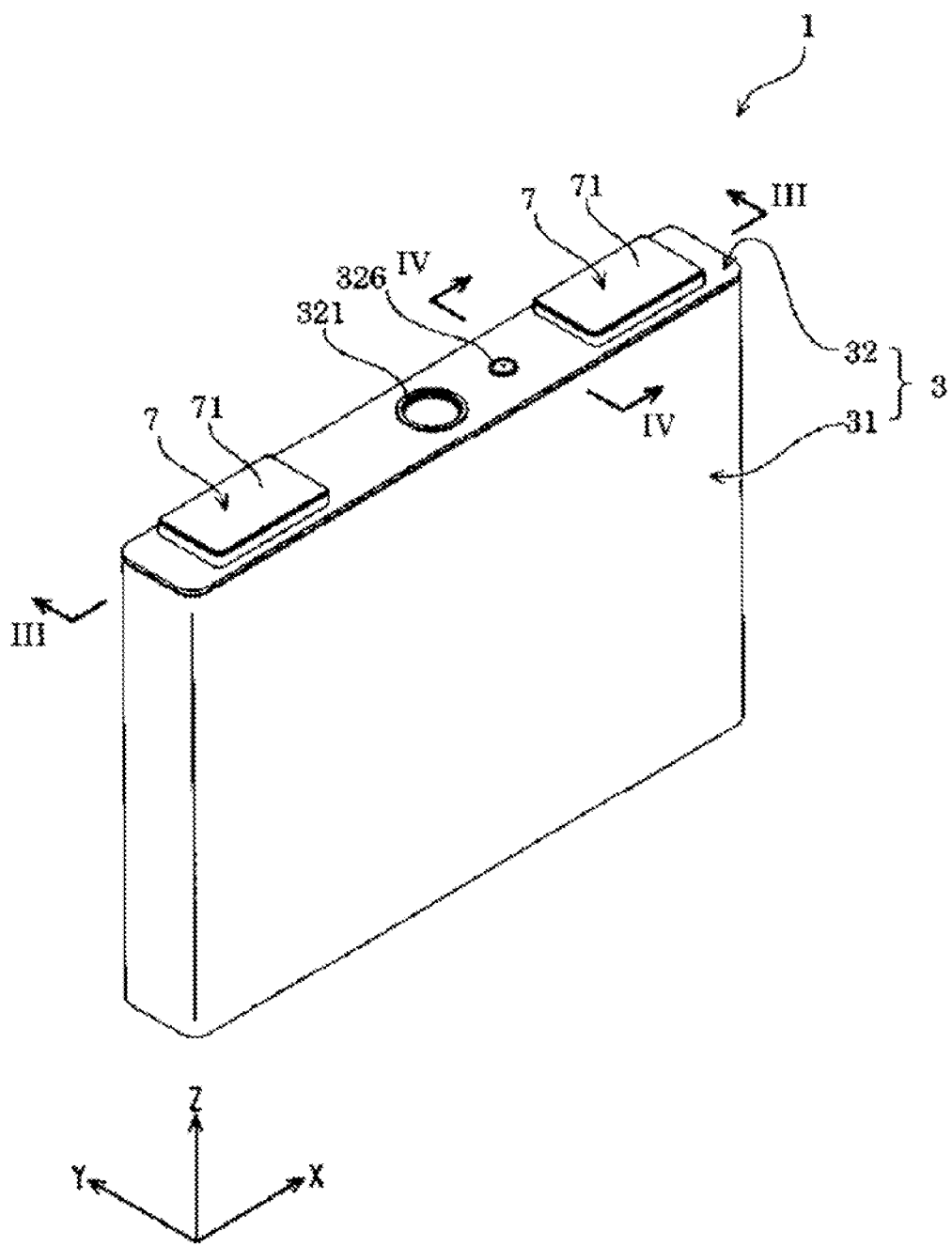
FIG. 1 is a perspective view of an energy storage device according to the present embodiment.
Figure 2:
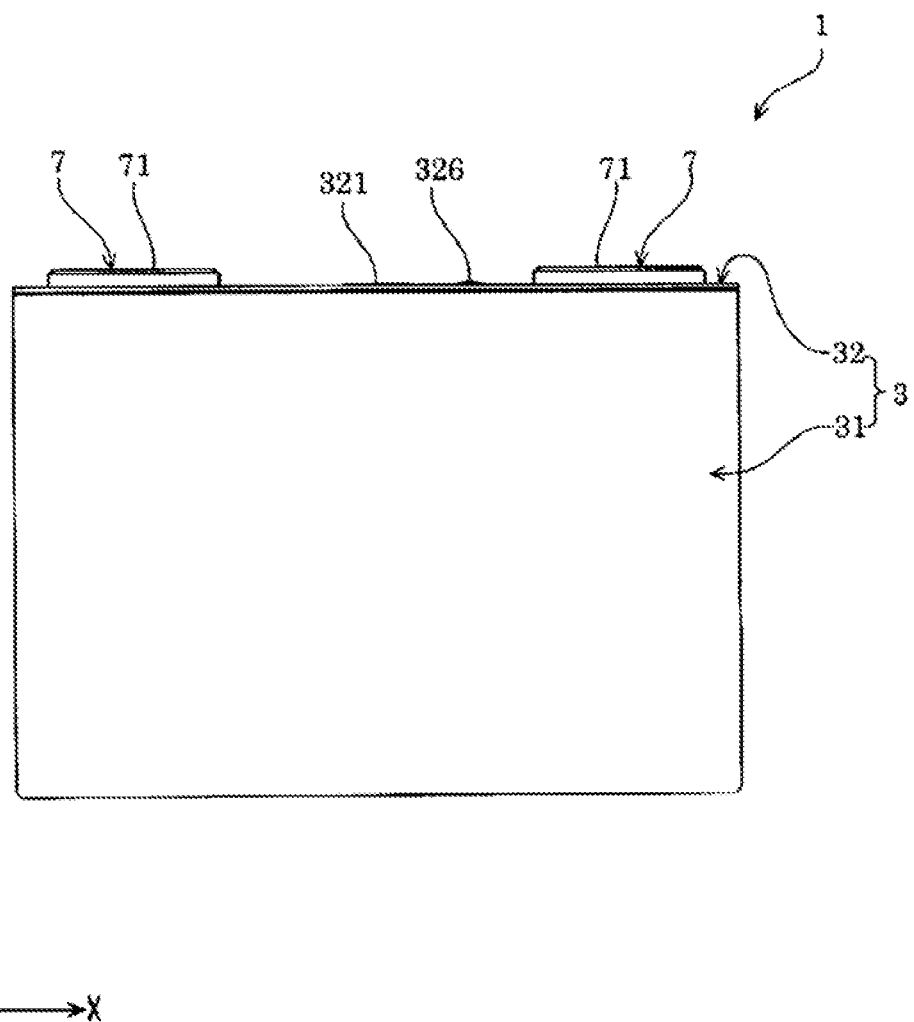
FIG. 2 is a front view of the energy storage device according to the embodiment.

Hereinafter, one embodiment of an energy storage device according to the present invention is described with reference to FIGS. 1 to 7. Examples of the energy storage device include a secondary battery and a capacitor. In the present embodiment, described as one example of the energy storage device is a chargeable and dischargeable secondary battery. The names of constituent members (constituent elements) in the present embodiment are those used in the present embodiment and are sometimes different from the names of the constituent members (constituent elements) in BACKGROUND ART.

An energy storage device 1 according to the present embodiment is a nonaqueous electrolyte secondary battery. In more detail, the energy storage device 1 is a lithium ion secondary battery that utilizes electron migration generated along with migration of lithium ions. This kind of energy storage device 1 supplies electric energy. The energy storage device 1 is used alone or in multiple devices. Specifically, the energy storage device 1 is used alone when required power and voltage are small. On the other hand, the energy storage device 1 in combination with another energy storage device 1 is used in an energy storage apparatus 100 when at least one of required power or voltage is large. In the energy storage apparatus 100, the energy storage devices 1 used in the energy storage apparatus 100 supply electric energy.

The energy storage device 1 includes, as shown in FIGS. 1 to 7, an electrode assembly 2 having a positive electrode 11 and a negative electrode 12, a case 3 that houses the electrode assembly 2, and an external terminal 7 that is disposed outside the case 3 and electrically conductive with the electrode assembly 2. The energy storage device 1 also includes, for example, a current collector 5 that allows electrical conduction between the electrode assembly 2 and the external terminal 7, in addition to the electrode assembly 2, the case 3, and the external terminal 7.

The electrode assembly 2 is formed by winding a layered product 22 that includes the positive electrode 11 and the negative electrode 12 layered on top of another with a separator 4 insulating the electrodes from each other.

The positive electrode 11 includes a metal foil 111 (positive substrate), an active material layer 112 that is disposed so as to cover a surface of the metal foil 111 and contains an active material, a conduction aid, and a binder, and a conductive layer 113 that is disposed between the metal foil 111 (positive substrate) and the active material layer 112 and contains a particulate conduction aid. In the present embodiment, the conductive layer 113 is layered on each of both surfaces of the metal foil 111. The active material layer 112 is layered on one surface of each of the conductive layers 113 that is a surface not overlapping with the metal foil 111. The active material layer 112 is disposed on each of both thickness-wise sides of the metal foil 111, and the conductive layer 113 is similarly disposed on each of both thickness-wise sides of the metal foil 111. The thickness of the positive electrode 11 is usually 40 µm or more and 150 µm or less.

The metal foil 111 is band-shaped. The metal foil 111 in the positive electrode 11 of the present embodiment is, for example, an aluminum foil. The positive electrode 11 includes a non-coated portion (part where no positive active material layer is formed) 115 of the positive active material layer 112 at one transverse, or width-wise edge of the band shape.

The thickness of the positive active material layer 112 may be 20 µm or more and 80 µm or less. The mass per unit area of the positive active material layer 112 may be 5 mg/cm$^2$ or more and 25 mg/cm$^2$ or less. The density of the positive active material layer 112 may be 1.6 g/cm$^3$ or more and 2.8 g/cm$^3$ or less. The values represent the thickness, the mass per unit area, and the density for one layer disposed so as to cover one surface of the metal foil 111. The density can be calculated from, for example, the thickness and the mass per unit area.

The active material in the positive electrode 11 is a particulate compound capable of storing and releasing lithium ions. The active material contains secondary particles formed by aggregation of primary particles. The average primary particle diameter of the active material in the positive electrode 11 is usually 0.1 µm or more and 1.5 µm or less. The average secondary particle diameter of the active material in the positive electrode 11 is 2.5 µm or more and 6.0 µm or less.

The average primary particle diameter is derived as follows. A manufactured battery is discharged at 2 V and then disassembled in a dry atmosphere. The positive electrode 11 is extracted, washed with dimethyl carbonate, and then subjected to vacuum drying for two hours or more. The positive active material layer 112 is scraped from the positive electrode 11 and the scraped powder is observed with a scanning electron microscope. In the image observed with the electron microscope, the particle diameter is measured for each of randomly selected at least 20 primary particles (primary particles that constitute secondary particles) of the active material. In the measurement of the particle diameter, a primary particle as a measurement target is surrounded by a minimum rectangle capable of surrounding the primary particle and the average value of long sides and short sides of the rectangle is determined to be a particle diameter of the primary particle. An average value is calculated from measured particle diameters and the calculated average value is determined to be the average primary particle diameter. The average secondary particle diameter can also be measured similarly. The measurement conditions are described in detail in EXAMPLES.

The average secondary particle diameter of the active material in the positive electrode 11 can also be measured as follows, for example. A positive electrode is extracted from a manufactured battery. The positive electrode is subjected to a dispersion treatment of dispersing particles by ultrasonic while keeping the positive electrode in N-methyl-2-pyrrolidone (NMP) or water. Performing filtration after the dispersion treatment gives a particulate active material. In the meantime, the active material is separated from a conduction aid, utilizing the difference in specific gravity therebetween. Used as a measuring device is a laser diffraction particle size distribution measuring apparatus ("SALD 2200" manufactured by SHIMADZU CORPORATION) and used as measurement control software is exclusive application software DMS ver2. A specific measurement technique, with a scattering type measurement mode employed, includes placing a wet cell, in which circulated is a dispersion having a measurement sample (active material) dispersed therein, in an ultrasonic environment for 2 minutes, and then irradiating the dispersion with laser light to obtain a distribution of scattered light from the measurement sample. Then, the distribution of scattered light is approximated by a logarithmic normal distribution, and in the particle size distribution (horizontal axis: a) with a range set at 0.021 µm as a minimum particle diameter and 2000 µm as a maximum particle diameter, a particle diameter corresponding to a degree of cumulative volume of 50% (D50) is determined to be the average particle diameter. The dispersion contains a surfactant, and SN DISPERSANT 7347-C (product name) or Triton X-100 (product name) as a dispersant. The dispersion can contain a few drops of the dispersant.

The average secondary particle diameter can be adjusted by changing the manufacturing conditions in a step of preparing the particulate active material (particularly, a granulating step and a firing step). The average secondary particle diameter can also be adjusted by changing the conditions of kneading or pressing in a step of preparing the electrode (positive electrode 11). For example, it is possible to decrease the average secondary particle diameter by increasing the press pressure (described later) in preparation of the positive active material layer 112.

The active material in the positive electrode 11 is, for example, a lithium metal oxide. Specific examples of the active material in the positive electrode include composite oxides (such as $Li_pCo_sO_2$, $Li_pNi_qO_2$, $Li_pMn_rO_4$, and $Li_p$-

Ni$_q$Mn$_r$Co$_s$O$_2$) represented by Li$_p$MeO$_t$ (Me represents one or two or more transition metals) and polyanionic compounds (such as Li$_t$Fe$_u$PO$_4$, Li$_t$Mn$_u$PO$_4$, Li$_t$Mn$_u$SiO$_4$, and Li$_t$Co$_u$PO$_4$F) represented by Li$_t$Me$_u$(XO$_v$)$_w$ (Me represents one or two or more transition metals and X represents, for example, P, Si, B, or V).

In the present embodiment, the active material in the positive electrode 11 is a lithium metal composite oxide represented by the chemical composition Li$_p$Ni$_q$Mn$_r$Co$_s$O$_t$ (in which p, q, r, s, and t satisfy: 0<p≤1.3, q+r+s=1, 0≤q≤1, 0≤r≤1, 0≤s≤1, and 1.7≤t≤2.3). Alternatively, q, r, and s may satisfy 0<q<1, 0<r<1, and 0<s<1, respectively.

Examples of the lithium metal composite oxide represented by the chemical composition Li$_p$Ni$_q$Mn$_r$Co$_s$O$_t$ as described above include LiNi$_{1/3}$Co$_{1/3}$Mn$_{1/3}$O$_2$, LiNi$_{1/6}$Co$_{1/6}$Mn$_{2/3}$O$_2$, and LiCoO$_2$.

Examples of the binder used in the positive active material layer 112 include polyvinylidene fluoride (PVdF), a copolymer of ethylene and vinyl alcohol, polymethyl methacrylate, polyethylene oxide, polypropylene oxide, polyvinyl alcohol, polyacrylic acid, polymethacrylic acid, and styrene-butadiene rubber (SBR). The binder in the present embodiment is polyvinylidene fluoride.

The conduction aid of the positive active material layer 112 is a carbonaceous material containing 98% by mass or more of carbon. Examples of the carbonaceous material include ketjen black (registered trade mark), acetylene black, and graphite. The positive active material layer 112 of the present embodiment contains acetylene black as the conduction aid. The primary particle diameter of the conduction aid is usually 10 nm or more and 100 nm or less in the case of carbon black and 1 μm or more and 100 μm or less in the case of graphite.

The thickness of the conductive layer 113 is usually 0.1 μm or more and 2.0 μm or less. The thickness of the conductive layer 113 is an average value of thickness at randomly selected at least 10 locations. The mass per unit area of the conductive layer 113 is usually 0.1 g/m$^2$ or more and 1.0 g/m$^2$ or less. The mass per unit area is derived as follows. When the mass per unit area is derived for the conductive layer 113 of a manufactured battery, the battery is discharged such that the potential of a negative electrode in the battery becomes 1.0 V or more, and then disassembled in a dry atmosphere. Next, the positive electrode 11 is washed with dimethyl carbonate and then subjected to vacuum drying for two hours or more. Subsequently, the positive active material layer 112 is removed from the positive electrode 11. In detail, a large part of the positive active material layer 112 is peeled with tape, and then, the part that has not been peeled is wiped out with, for example, NMP or water, or removed by ultrasonic cleaning. Then, the positive electrode having the positive active material layer removed therefrom is subjected to vacuum drying for two hours or more. The mass of the positive electrode is measured that has the positive active material layer 112 removed therefrom. The size of a sample to be measured is preferably 50 cm$^2$ or more. Further, the conductive layer 113 is removed with, for example, heated NMP or water. The mass of the positive electrode is measured that has the conductive layer 113 removed therefrom. The mass per unit area of the conductive layer 113 is derived by deducting the mass of the positive electrode having the conductive layer 113 removed therefrom, from the mass of the positive electrode having the positive active material layer 112 removed therefrom. When it is difficult to peel the conductive layer 113, the mass per unit area of the conductive layer 113 may be derived by measuring the mass of the metal foil from only the metal foil 111 part having neither the positive active material layer 112 nor the conductive layer 113 layered thereon and deducting the mass of the metal foil from the positive electrode having the active material layer 112 removed therefrom.

Figure 7:
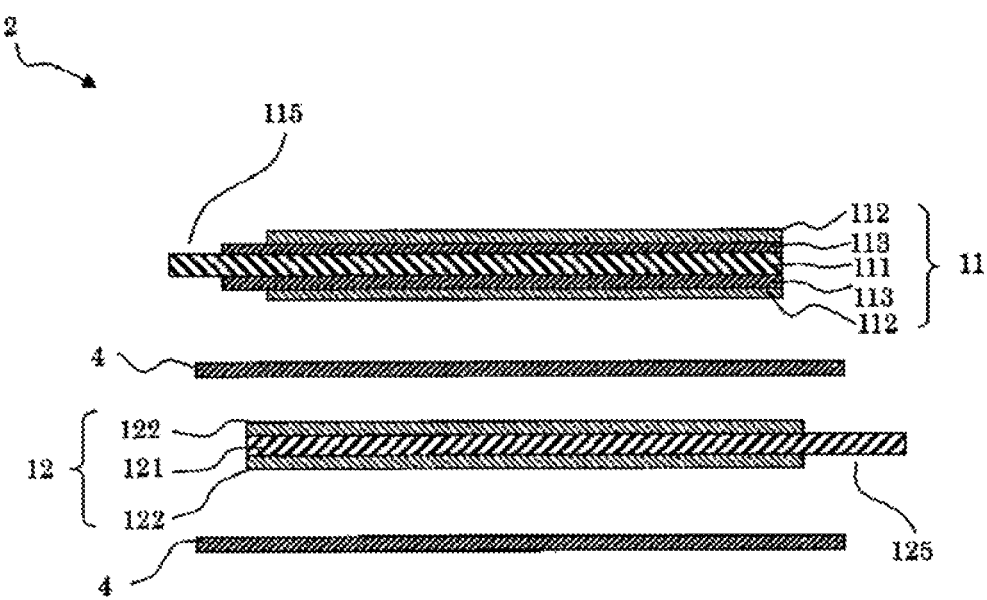
FIG. 7 is a sectional view of a positive electrode, a negative electrode, and a separator that have been layered on top of another (a VII-VII sectional view of FIG. 6).
Figure 8:
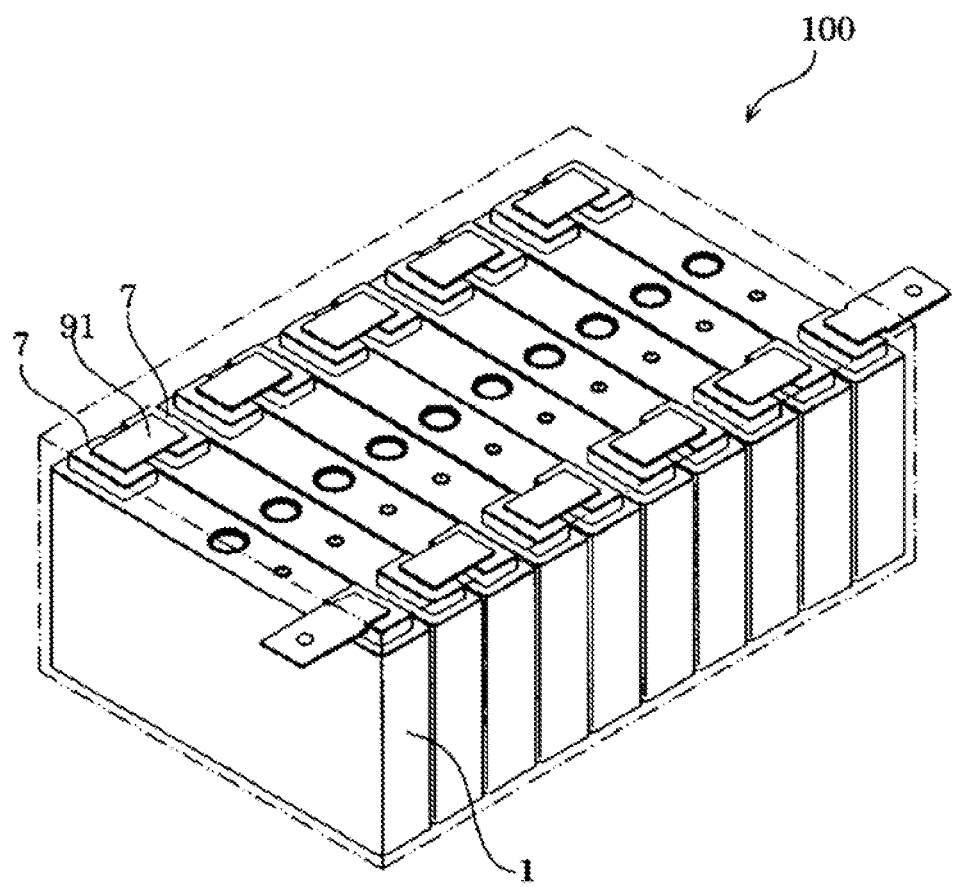
FIG. 8 is a perspective view of an energy storage apparatus including energy storage devices according to the embodiment.
Figure 8:
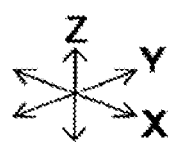

The conductive layer 113 is porously formed by voids among particles of the conduction aid. The surface roughness Ra of one surface of the conductive layer 113 that is a surface overlapping with the active material layer 112 is 0.17 μm or more and 0.50 μm or less. In the present embodiment, an outer edge of the positive active material layer 112 is disposed inside an outer edge of the conductive layer 113 as shown in FIG. 7. For example, the surface roughness Ra is measured at a portion that protrudes outside the outer edge of the positive active material layer 112. The surface roughness Ra is arithmetic average roughness measured in accordance with JIS B0601: 2013. The surface roughness Ra can be adjusted, for example, by changing the blending ratio between the conduction aid and the binder (described later) that are contained in the conductive layer 113, by changing the coating conditions in a coating method for forming the conductive layer 113, or by changing the drying conditions of a conductive layer composition (described later) containing a solvent. For example, it is possible to increase the surface roughness Ra by increasing the mass ratio of the conduction aid to the binder that are contained in the conductive layer 113. When the positive active material layer is present outside the outer edge of the conductive layer 113 (there is no portion where the conductive layer is exposed), the surface roughness Ra of the conductive layer 113 can be measured after the positive active material layer 112 is peeled as described above.

The conductive layer 113 contains the conduction aid and the binder (binding agent). The conductive layer 113 contains no positive active material. The conductive layer 113 has conductivity because it contains the conduction aid. The conductive layer 113 becomes a route for electrons between the metal foil 111 and the positive active material layer 112 and retains conductivity between these layers. The conductivity of the conductive layer 113 is usually higher than the conductivity of the active material layer 112. When prepared, the conductive layer 113 may be identical with the positive active material layer 112 and/or a negative active material layer 122. This configuration is capable of increasing the compatibility between a solvent contained in the positive active material layer 112 and/or the negative active material layer 122 and a solvent contained in the conductive layer 113, so that it is possible to more increase the adhesiveness between the layers.

The conductive layer 113 is disposed between the metal foil 111 and the positive active material layer 112. The conductive layer 113 containing the binder (binding agent) has sufficient adhesiveness to the metal foil 111. The conductive layer 113 has also sufficient adhesiveness to the positive active material layer 112.

The conduction aid of the conductive layer 113 is particulate. The conduction aid is a carbonaceous material containing 98% by mass or more of carbon. The electrical conductivity of the carbonaceous material is usually 10$^{-6}$ S/m or more. Examples of the carbonaceous material include ketjen black (registered trade mark), acetylene black, and graphite. The conductive layer 113 of the present embodiment contains acetylene black as the conduction aid. The conduction aid may be spherical. The conduction aid is determined to be spherical when having a b/a value of 0.7 to 1.0, with a major diameter (long side) of the conduction aid defined as a and a minor diameter (short side) as b. The particle diameter of the conduction aid may be 20 nm or more and 40 nm or less. This constitution is considered to form small recesses and projections on the conductive layer 113 and thus more improve the adhesiveness.

The particle diameter of the conduction aid is derived as follows. A battery is discharged such that the potential of a negative electrode in the battery becomes 1.0 V or more, and then disassembled in a dry atmosphere. Next, the positive electrode 11 is washed with dimethyl carbonate and then subjected to vacuum drying for two hours or more. In the positive electrode 11, peeled with a cutter is a portion of the conductive layer 113 where the conductive layer 113 does not overlap with the positive active material layer 112. Powder of the peeled conductive layer thus obtained is observed with a TEM and confirmed for its particle diameter. In the image observed with the electron microscope, the particle diameter is measured for each of randomly selected at least 20 particles of the conduction aid by the following method. In the measurement of the particle diameter, a primary particle as a measurement target is surrounded by a minimum rectangle capable of surrounding the primary particle and the average value of long sides and short sides of the rectangle is determined to be a particle diameter of the primary particle.

Examples of the binder in the conductive layer 113 include synthetic polymer compounds such as polyvinylidene fluoride (PVdF), a copolymer of vinylidene fluoride and hexafluoropropylene, a copolymer of ethylene and vinyl alcohol, polyacrylonitrile, a polyphosphazene, a polysiloxane, polyvinyl acetate, polymethyl methacrylate, polystyrene, polycarbonate, a polyamide, a polyimide, a polyamideimide, polyethylene oxide (polyethylene glycol), polypropylene oxide (polypropylene glycol), polyvinyl alcohol, polyacrylic acid, polymethacrylic acid, polytetrafluoroethylene (PTFE), styrene-butadiene rubber (SBR), a polyolefin, and nitrile-butadiene rubber. The binder may contain a hydroxyalkyl chitosan. This composition makes the binder difficult to expand by charge-discharge and thus capable of further suppressing a decrease in power caused by repetitive charge-discharge in a high-temperature environment.

The conductive layer 113 may contain 30% by mass or more and 70% by mass or less of a carbonaceous material as the conduction aid. This composition forms the conductive layer 113 that hardly has a difference in change of surface resistance between before and after immersion in an electrolyte solution. The conductive layer 113 may contain 30% by mass or more and 70% by mass or less of the binder.

The negative electrode 12 includes a metal foil 121 (negative substrate), a negative active material layer 122 that is formed on the metal foil 121. In the present embodiment, the negative active material layer 122 is layered on each of both surfaces of the metal foil 121. The metal foil 121 is band-shaped. The metal foil 121 of the negative electrode in the present embodiment is, for example, a cupper foil. The negative electrode 12 includes a negative active material layer non-coated portion (part where no negative active material layer is formed) 125 at one transverse, or widthwise edge of the band shape. Generally, a thickness of the negative electrode 12 is 40 μm or more and 150 μm or less.

The negative active material layer 122 includes a particulate active material and a binder. The negative active material layer 122 is disposed to face the positive electrode 11 with the separator 4 interposed therebetween. A width of the negative active material layer 122 is larger than a width of the positive active material layer 112. Generally, a thickness of the negative active material layer 122 is 10 μm or more and 70 μm or less.

In the negative active material layer 122, a ratio of the binder may be 1 mass % or more and 10 mass % or less with respect to a total mass of the negative active material and the binder.

The active material of the negative electrode 12 is an active material which can contribute to an electrode reaction such as a charging reaction and a discharging reaction in the negative electrode 12. For example, the active material of the negative electrode 12 is a carbon material such as graphite, amorphous carbon (hardly graphitizable carbon, easily graphitizable carbon) or a material with which lithium ions can make an alloy such as silicon (Si) and tin (Sn). The active material of the negative electrode in the present embodiment is amorphous carbon. To be more specific, the active material of the negative electrode is hardly graphitizable carbon.

The average particle diameter of the active material in the negative electrode 12 is usually 1 μm or more and 10 μm or less.

The mass per unit area of the negative active material layer 122 (one layer) is usually 2.5 mg/cm$^2$ or more and 15.0 mg/cm$^2$ or less. The density of the negative active material layer 122 (one layer) is usually 0.90 g/cm$^3$ or more and 1.30 g/cm$^3$ or less.

The binder used in the negative active material layer 122 is the same as the binder used in the positive active material layer 112. The binder in the present embodiment is polyvinylidene fluoride.

The negative active material layer 122 may further contain a conduction aid such as ketjen black (registered trademark), acetylene black, or graphite.

The electrode assembly 2 of the present embodiment is formed by winding the thus constituted positive electrode 11 and negative electrode 12 with the separator 4 insulating the electrodes from each other. That is, the electrode assembly 2 of the present embodiment is formed by winding the layered product 22 including the positive electrode 11, the negative electrode 12, and the separator 4. The separator 4 is a member having insulation quality. The separator 4 is disposed between the positive electrode 11 and the negative electrode 12. This configuration insulates the positive electrode 11 from the negative electrode 12 in the electrode assembly 2 (specifically, the layered product 22). The separator 4 retains an electrolyte solution in the case 3. This configuration allows lithium ions to migrate between the positive electrode 11 and the negative electrode 12 that are alternately layered with the separator 4 sandwiched therebetween during charge-discharge of the energy storage device 1.

The separator 4 is band-shaped. The separator 4 includes a porous separator substrate. The separator 4 of the present embodiment only includes the separator substrate. The separator 4 is disposed between the positive electrode 11 and the negative electrode 12 to prevent a short circuit between the positive electrode 11 and the negative electrode 12.

The separator substrate is made to be porous by, for example, woven fabric, non-woven fabric, or a porous film. Examples of a material for the separator substrate include a polymer compound, glass, and ceramic. Examples of the polymer compound include polyesters such as polyacrylonitrile (PAN), a polyamide (PA), and polyethylene terephthalate (PET), polyolefins (PO) such as polypropylene (PP) and polyethylene (PE), and cellulose.

Figure 6:
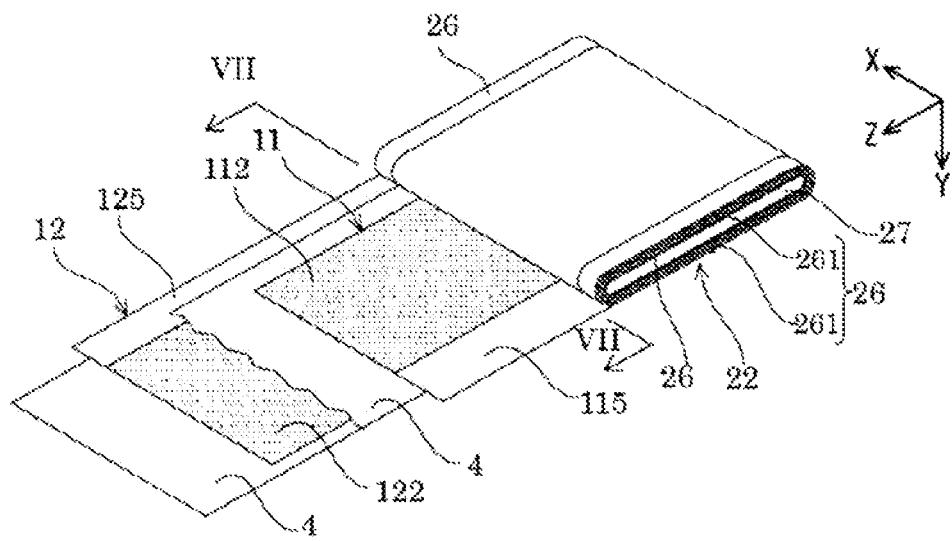
FIG. 6 is a view for illustrating a configuration of the electrode assembly of the energy storage device according to the embodiment.

The width of the separator 4 (transverse dimension of the band shape) is slightly larger than the width of the negative active material layer 122. The separator 4 is disposed between the positive electrode 11 and the negative electrode 12 that are transversely shifted and layered on top of another such that the positive active material layer 112 overlaps with the negative active material layer 122. In the layering, the non-coated portion 115 of the positive electrode 11 does not overlap with the non-coated portion 125 of the negative electrode 12 as shown in FIG. 6. That is, the non-coated portion 115 of the positive electrode 11 transversely protrudes from a region where the positive electrode 11 overlaps with the negative electrode 12, whereas the non-coated portion 125 of the negative electrode 12 transversely (oppositely from the protrusion of the non-coated portion 115 of the positive electrode 11) protrudes from the region where the positive electrode 11 overlaps with the negative electrode 12. The layered positive electrode 11, negative electrode 12, and separator 4, or the layered product 22 is wound to form the electrode assembly 2. A part where only the non-coated portion 115 of the positive electrode 11 or the non-coated portion 125 of the negative electrode 12 is layered forms a non-coated layered portion 26 in the electrode assembly 2.

The non-coated layered portion 26 is a part of the electrode assembly 2 that is electrically conductive with the current collector 5. The non-coated layered portion 26 is sectioned into two parts (two divided non-coated layered portions) 261 with a hollow portion 27 (see FIG. 6) sandwiched between the parts in view toward the winding center of the wound positive electrode 11, negative electrode 12, and separator 4.

The thus configured non-coated layered portion 26 is provided in each of the electrodes of the electrode assembly 2. That is, the non-coated layered portion 26 obtained by layering only the non-coated portion 115 of the positive electrode 11 forms the non-coated layered portion of the positive electrode 11 in the electrode assembly 2, and the non-coated layered portion 26 obtained by layering only the non-coated portion 125 of the negative electrode 12 forms the non-coated layered portion of the negative electrode 12 in the electrode assembly 2.

The case 3 includes a case main body 31 having an opening, and a cover plate 32 that covers (closes) the opening of the case main body 31. The case 3 houses in an inner space thereof an electrolyte solution together with, for example, the electrode assembly 2 and the current collector 5. The case 3 is formed of a metal having resistance to the electrolyte solution. The case 3 is formed of, for example, an aluminum-based metal material such as aluminum or an aluminum alloy. The case 3 may be formed of, for example, a metal material such as stainless steel or nickel, or a composite material obtained by bonding a resin such as nylon to aluminum.

The electrolyte solution is a nonaqueous electrolyte solution. The electrolyte solution is obtained by dissolving an electrolyte salt in an organic solvent. Examples of the organic solvent include cyclic carbonate esters such as propylene carbonate and ethylene carbonate, and chain carbonates such as dimethyl carbonate, diethyl carbonate, and ethyl methyl carbonate. Examples of the electrolyte salt include $LiClO_4$, $LiBF_4$, and $LiPF_6$. The electrolyte solution of the present embodiment is one obtained by dissolving 0.5 to 1.5 mol/L of $LiPF_6$ in a mixed solvent obtained by mixing propylene carbonate, dimethyl carbonate, and ethyl methyl carbonate in a predetermined ratio.

The case 3 is formed by joining a periphery of the opening of the case main body 31 with a periphery of the cover plate 32 that is rectangular while the peripheries are layered on top of another. The case 3 includes the inner space defined by the case main body 31 and the cover plate 32. In the present embodiment, the periphery of the opening of the case main body 31 is joined with the periphery of the cover plate 32 by welding.

Hereinafter, as shown in FIG. 1, the long side line of the cover plate 32 is defined as an X-axis, the short side line of the cover plate 32 as a Y-axis, and the normal of the cover plate 32 as a Z-axis.

The case main body 31 has a prismatic tube shape whose one end along a line between openings (Z-axis) is covered (that is, a bottomed prismatic tube shape). The cover plate 32 is a tabular member that covers the opening of the case main body 31.

The cover plate 32 includes a gas release valve 321 capable of exteriorly releasing gas in the case 3. The gas release valve 321 exteriorly releases gas from within the case 3 when the internal pressure of the case 3 has risen to a predetermined pressure. The gas release valve 321 is provided in a center portion along the X-axis of the cover plate 32.

The case 3 is provided with an electrolyte solution filling hole for injecting the electrolyte solution therethrough. The electrolyte solution filling hole communicates between the interior and the exterior of the case 3. The electrolyte solution filling hole is provided on the cover plate 32. The electrolyte solution filling hole is sealed (covered) with an electrolyte solution filling plug 326. The electrolyte solution filling plug 326 is fixed to the case 3 (the cover plate 32 in an example of the present embodiment) by welding.

The external terminal 7 is a part that is electrically connected to, for example, the external terminal 7 of another energy storage device 1 or external equipment. The external terminal 7 is formed of a member having conductivity. For example, the external terminal 7 is formed of an aluminum-based metal material such as aluminum or an aluminum alloy, or a highly weldable metal material such as a copper-based metal material (e.g., copper or a copper alloy).

The external terminal 7 has a surface 71 weldable with, for example, a bus bar. The surface 71 is a flat surface. The external terminal 7 has a tabular shape extending along the cover plate 32. In detail, the external terminal 7 has a rectangular tabular shape in Z-axis view.

The current collector 5 is disposed in the case 3 and is directly or indirectly connected to the electrode assembly 2 in an electrically conductive manner. The current collector 5 of the present embodiment is connected to the electrode assembly 2 in an electrically conductive manner with a clip member 50 interposed therebetween. That is, the energy storage device 1 includes the clip member 50 that enables connection between the electrode assembly 2 and the current collector 5 in an electrically conductive manner.

Figure 3:
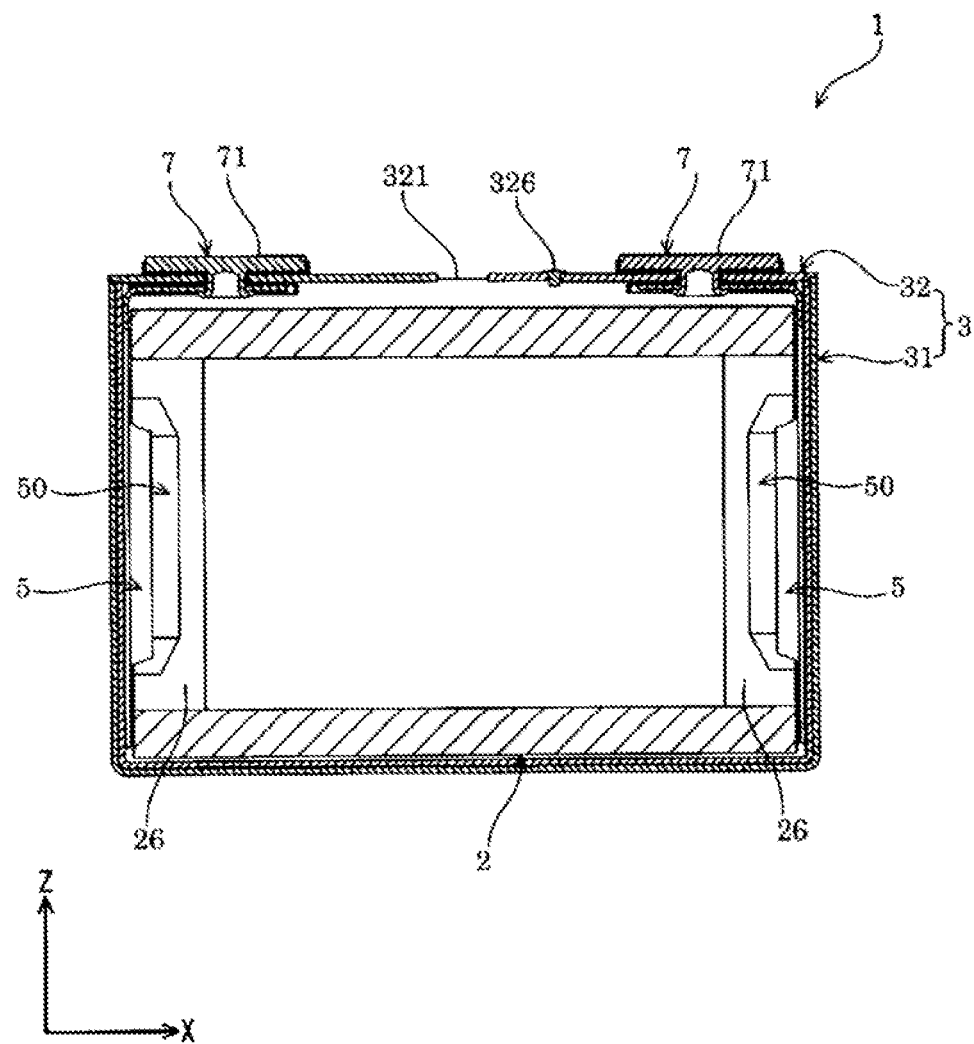
FIG. 3 is a sectional view taken along a line III-III in FIG. 1.
Figure 4:
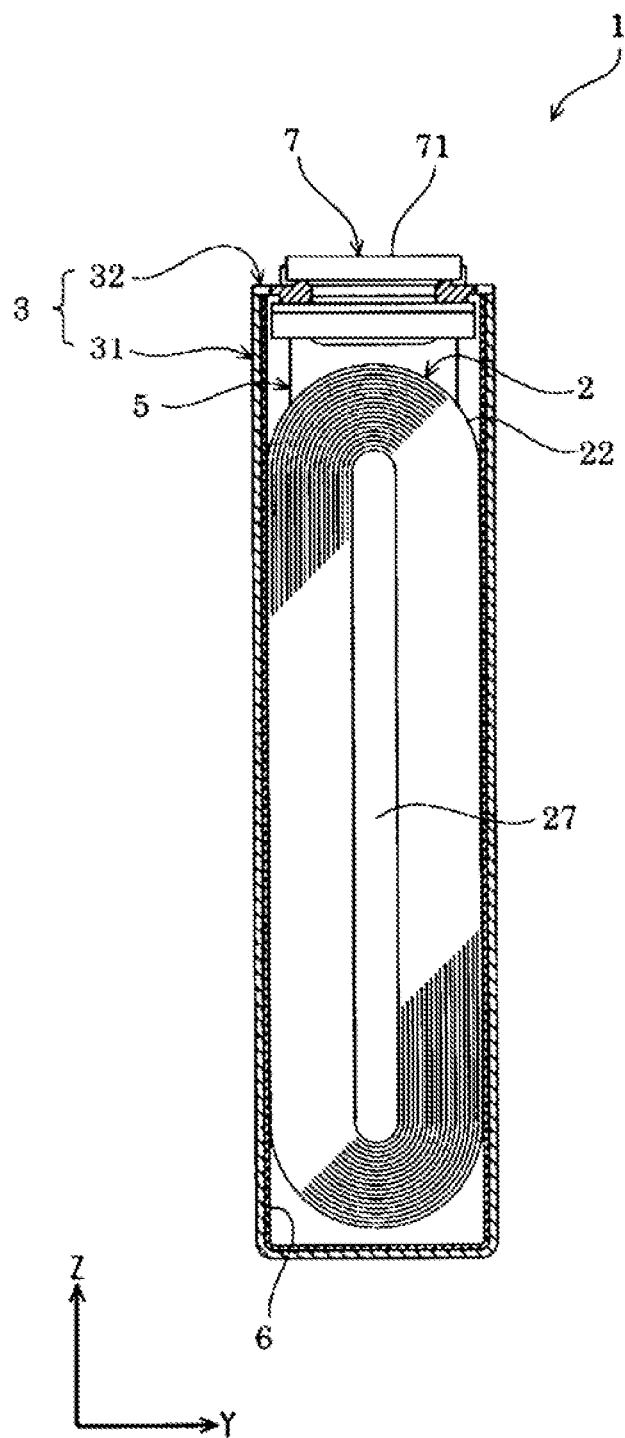
FIG. 4 is a sectional view taken along a line IV-IV in FIG. 1.
Figure 5:
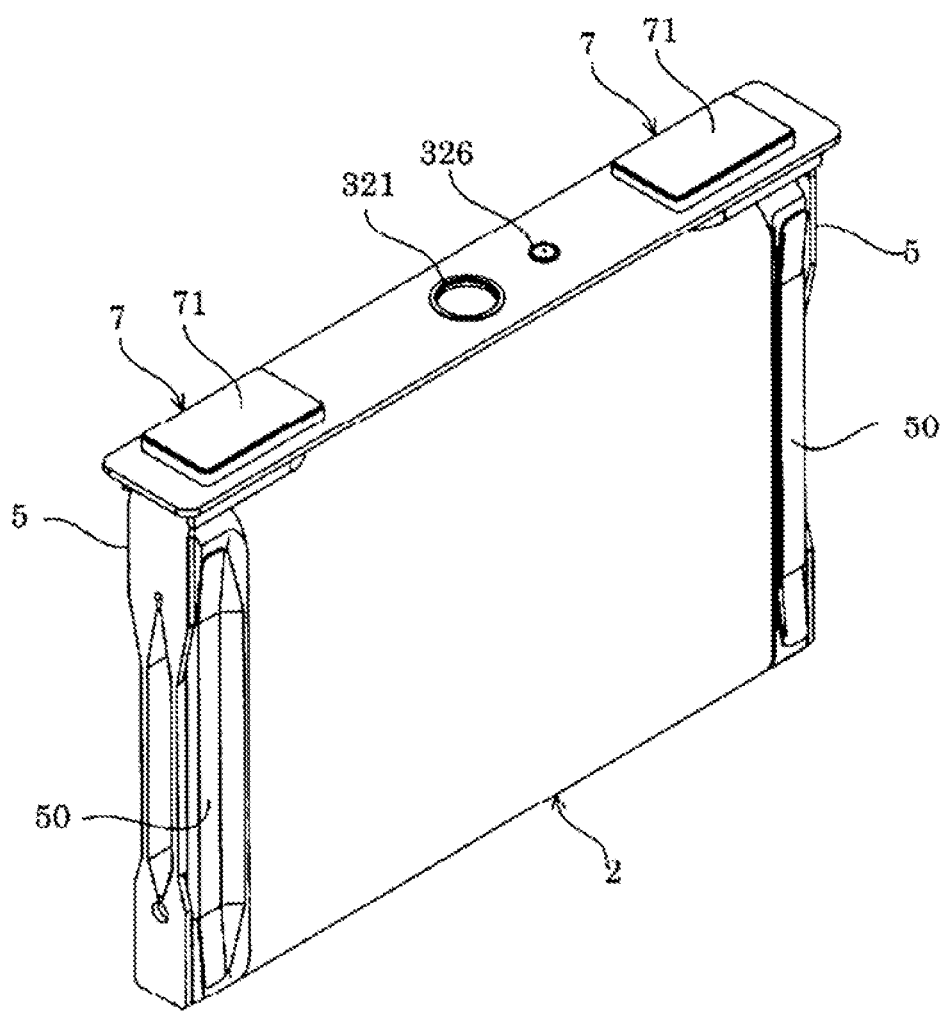
FIG. 5 is a perspective view of the energy storage device according to the embodiment that has been partially constructed and is a perspective view showing an electrolyte solution filling plug, an electrode assembly, a current collector, and an external terminal that have been attached to a cover plate.

The current collector 5 is formed of a member having conductivity. As shown in FIG. 3, the current collector 5 is disposed along an inner surface of the case 3. The current collector 5 is disposed on each of the positive electrode 11 and the negative electrode 12 in the energy storage device 1. In the energy storage device 1 of the present embodiment, the current collector is, in the case 3, disposed on each of the non-coated layered portion 26 of the positive electrode 11 and the non-coated layered portion 26 of the negative electrode 12 in the electrode assembly 2.

The current collector 5 of the positive electrode 11 and the current collector 5 of the negative electrode 12 are formed of different materials. Specifically, the current collector 5 of the positive electrode 11 is formed of, for example, aluminum or an aluminum alloy and the current collector 5 of the negative electrode 12 is formed of, for example, copper or a copper alloy.

In the energy storage device 1 of the present embodiment, the case 3 houses therein the electrode assembly 2 (specifically, the electrode assembly 2 and the current collector 5) housed in a bag-shaped insulating cover 6 that insulates the electrode assembly 2 from the case 3.

Next described is a method for manufacturing the energy storage device 1 according to the embodiment.

Figure 9:
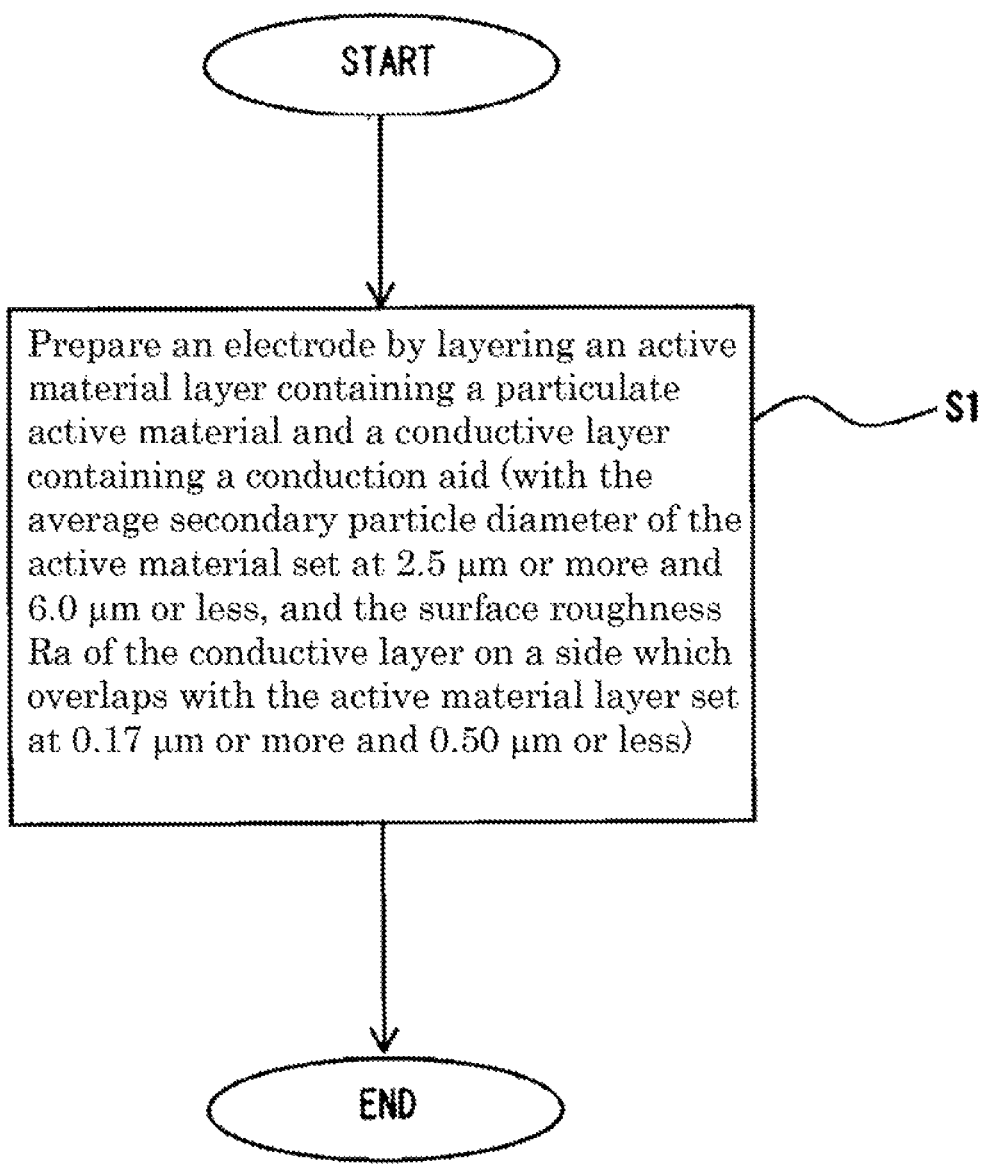
FIG. 9 is a flowchart showing a step of a method for manufacturing an energy storage device.

The method for manufacturing the energy storage device 1 according to the embodiment includes, as shown in FIG. 9, preparing an electrode by layering an active material layer containing a particulate active material and a conductive layer containing a conduction aid on top of another (step 1 S1). The average secondary particle diameter of the active material is 2.5 μm or more and 6.0 μm or less, and the surface roughness Ra of the conductive layer on a side which overlaps with the active material layer is set at 0.17 μm or more and 0.50 μm or less in the step 1.

In detail, the method includes the step 1 and assembling the electrode prepared in the step 1, an electrolyte solution, and a case 3 into the energy storage device (step 2 S2).

In the step 1, when a positive electrode 11 is prepared, a conductive layer composition containing at least a conduction aid and a solvent is applied to a metal foil (electrode substrate) and a composite containing an active material is further applied to form an active material layer, thus preparing the electrode (positive electrode 11). In the step 2, the positive electrode 11, a separator 4, and a negative electrode 12 are layered on top of another to form an electrode assembly 2. The electrode assembly 2 is put in the case 3 and the electrolyte solution is poured into the case 3 to construct the energy storage device 1.

In the step 1, in order to prepare the electrode (positive electrode 11), the conductive layer composition containing the conduction aid, a binder, and the solvent is applied to each of both surfaces of the metal foil and the composition is dried at, for example, 100 to 160 degrees to form a conductive layer 113. As described above, the surface roughness Ra of the conductive layer 113 can be adjusted, for example, by changing the blending ratio between the conduction aid and the binder that are contained in the conductive layer 113, by changing the coating conditions in a coating method for forming the conductive layer 113, or by changing the drying conditions of the conductive layer composition containing the solvent.

In the step 1, the composite containing the active material, a binder, and a solvent is applied to each of the conductive layers to form a positive active material layer 112. It is possible to adjust the mass per unit area of the conductive layer 113 or the positive active material layer 112 by adjusting the application amount thereof. The conductive layer 113 or the positive active material layer 112 that has been applied is subjected to roll pressing at a predetermined temperature (for example, 80 to 150° C.) and a predetermined pressure. It is possible to adjust the density of the conductive layer 113 or the positive active material layer 112 by adjusting the press pressure. After the pressing, the positive electrode is subjected to vacuum drying at 80 to 140° C. for 12 to 24 hours. A negative electrode is also prepared similarly without forming the conductive layer.

In the step 2, in order to form the electrode assembly 2, a layered product 22 is wound that includes the positive electrode 11 and the negative electrode 12 with the separator 4 sandwiched therebetween. In detail, the layered product 22 is prepared by layering the positive electrode 11, the separator 4, and the negative electrode 12 on top of another such that the positive active material layer 112 and a negative active material layer 122 face each other with the separator 4 interposed therebetween. The layered product 22 is wound to form the electrode assembly 2.

In the step 2, in order to construct the energy storage device 1, the electrode assembly 2 is put in a case main body 31 of the case 3, an opening of the case main body 31 is covered with a cover plate 32, and the electrolyte solution is injected into the case 3. When the opening of the case main body 31 is covered with the cover plate 32, the electrode assembly 2 is put in the case main body 31 and the opening of the case main body 31 is covered with the cover plate 32 while the positive electrode 11 is electrically conductive with one external terminal 7 and the negative electrode 12 is electrically conductive with the other external terminal 7. When the electrolyte solution is injected into the case 3, the electrolyte solution is injected into the case 3 through an injection hole on the cover plate 32 of the case 3.

The energy storage device 1 according to the present embodiment that is configured as described above includes the electrode (positive electrode 11) having: the active material layer 112 containing a particulate active material; and the conductive layer 113 that is layered on one surface of the active material layer 112 and contains a conduction aid. The average secondary particle diameter of the active material in the positive electrode 11 is 2.5 μm or more and 6.0 μm or less. The surface roughness Ra of one surface of the conductive layer 113 in the positive electrode 11 that is a surface overlapping with the active material layer 112 is 0.17 μm or more and 0.50 μm or less. With the average secondary particle diameter of the active material being 2.5 μm or more and 6.0 μm or less and the surface roughness Ra of the surface of the conductive layer 113 being 0.17 μm or more and 0.50 μm or less, it is possible to make the active material layer 112 sufficiently adhere to the conductive layer 113. Sufficient adhesion of the active material layer 112 to the conductive layer 113 suppresses an increase in internal resistance of the energy storage device 1 caused by peeling of the active material layer 112 from the conductive layer 113 due to repetitive charge-discharge in a high-temperature environment. Accordingly, in the energy storage device 1, a decrease in power is suppressed that is caused by repetitive charge-discharge in a high-temperature environment.

With the surface roughness Ra being less than 0.17 μm, it is impossible to sufficiently obtain an anchoring effect by the surface of the conductive layer 113, possibly making the active material layer 112 incapable of sufficiently adhering to the conductive layer 113. On the other hand, with the surface roughness Ra of the surface being larger than 0.50 μm, while it is possible to somewhat suppress a decrease in power, the suppression is not always sufficient in comparison with the case of a surface roughness Ra of 0.50 μm or less. A reason why this phenomenon is caused is considered to be because variation in current distribution is caused between the active material layer 112 and the conductive layer 113 during charge-discharge to somewhat accelerate deterioration of the energy storage device during charge-discharge.

In the energy storage device 1, the mass per unit area of the conductive layer 113 in the positive electrode 11 may be 0.1 $g/m^2$ or more and 1.0 $g/m^2$ or less. The density of the active material layer 112 in the positive electrode 11 may be 1.6 $g/cm^3$ or more and 2.8 $g/cm^3$ or less. With the mass per unit area of the conductive layer 113 and the density of the active material layer 112 in the positive electrode 11 being within the above-mentioned ranges, respectively, a decrease in power is sufficiently suppressed that is caused by repetitive charge-discharge in a high-temperature environment.

The energy storage device according to the present invention is not limited to the embodiment, and it is, needless to say, possible to variously change the energy storage device within a scope not departing from the gist of the present invention. For example, it is possible to add the configuration of one embodiment to the configuration of another embodiment, or it is possible to substitute a part of the configuration of one embodiment with the configuration of another embodiment. Further, it is possible to remove a part of the configuration of one embodiment.

In the above-mentioned embodiment, the electrode is explained in which the active material layers is disposed on each of both surfaces of the metal foils. In the energy storage device according to the invention, the positive electrode 11 or the negative electrode 12 may include the active material layer on only one surface of the metal foil.

In the above-mentioned embodiment, the energy storage device 1 is explained in which the electrode assembly 2 is formed by winding a layered product 22. The energy storage device of this invention may include the layered product 22 which is not wound. Specifically, the energy storage device may include an electrode assembly formed by layering a positive electrode, a separator, a negative electrode, and a separator in this order, each of which is formed in rectangle shape.

In the above-mentioned embodiment, a case is explained in which the energy storage device 1 is a nonaqueous electrolyte secondary battery (lithium ion secondary battery) capable of charging and discharging. However, a kind of the energy storage device 1 and a size (capacity) are arbitrary. Further, in the above-mentioned embodiment, as an example of the energy storage device, a lithium ion secondary battery is explained; however, the energy storage device is not limited thereto. For example, the present invention is applicable to various kinds of secondary batteries, capacitors such as an electric double layer capacitor or the like.

The energy storage device (for example, a battery) may be used in an energy storage apparatus 100 (a battery module in case that the energy storage device is a battery). The energy storage apparatus includes: at least two energy storage devices 1 and a bus bar 91 which connects two energy storage devices which is different from each other. In this case, it is sufficient if the technique of the present invention is applied to at least one of the energy storage devices.

EXAMPLES

A nonaqueous electrolyte secondary battery (lithium ion secondary battery) was manufactured as described below.

Example 1

(1) Preparation of Positive Electrode

First, N-methyl-2-pyrrolidone (NMP) as a solvent, a conduction aid (acetylene black), and a binder (hydroxyethyl chitosan), a crosslinking agent (pyromellitic acid) were mixed and kneaded to prepare a conductive layer composition. The blending amounts of the conduction aid, the binder, and the crosslinking agent were set at a mass ratio of 1:1:1 in solid content after volatilization of the solvent. The prepared conductive layer composition was applied to both surfaces of an aluminum foil (thickness: 15 m) with a gravure coater such that the application amount (mass per unit area) after drying became 0.30 g/m$^2$, followed by drying.

Next, N-methyl-2-pyrrolidone (NMP) as a solvent, a conduction aid (acetylene black), a binder (PVdF), and particles of an active material ($LiNi_{1/3}Co_{1/3}Mn_{1/3}O_2$) having an average particle diameter of 5 μm were mixed and kneaded to prepare a positive electrode composite. The blending amounts of the conduction aid, the binder, and the active material were set at 4.5% by mass, 4.5% by mass, and 91% by mass, respectively. The prepared positive electrode composite was applied onto each of the conductive layers with a die head coater such that the application amount (mass per unit area) after drying became 8.61 mg/cm$^2$. The positive electrode composite was applied such that the area of a positive active material layer became smaller than the area of the conductive layer. The positive electrode was dried and subject to roll pressing. Then, the positive electrode was subjected to vacuum drying to remove, for example, moisture. The thickness of the pressed active material layer (one layer) was 34 μm. The density of the active material layer was 2.53 g/cm$^3$. The average secondary particle diameter of the active material in the pressed active material layer was 3.1 μm. The thickness of the pressed conductive layer was 1 μm or less.

(2) Preparation of Negative Electrode

Used as an active material was particulate amorphous carbon (hardly graphitizable carbon) having an average particle diameter of 3.0 μm. Used as a binder was PVdF. A negative electrode composite was prepared by mixing and kneading NMP as a solvent, the binder, and the active material. The binder was blended in an amount of 7% by mass and the active material was blended in an amount of 93% by mass. The prepared negative electrode composite was applied to each of both surfaces of a copper foil (thickness: 10 μm) such that the application amount (mass per unit area) after drying became 4.0 mg/cm$^2$. The negative electrode was dried, subjected to roll pressing, and subjected to vacuum drying to remove, for example, moisture. The thickness of the active material layer (one layer) was 35 μm. The density of the active material layer was 1.14 g/cm$^3$.

(3) Separator

Used as a separator substrate was polyethylene-made fine porous film having a thickness of 21 μm. The air permeability of the polyethylene-made fine porous film was 100 s/100 cc.

(4) Preparation of Electrolyte Solution

Used as an electrolyte solution was one prepared by the following method. Used as a nonaqueous solvent was a solvent obtained by mixing 1 part by mass of each propylene carbonate, dimethyl carbonate, and ethyl methyl carbonate. $LIPF_6$ was dissolved in this nonaqueous solvent to give a salt concentration of 1 mol/L. Thus, the electrolyte solution was prepared.

(5) Disposition of Electrode Assembly in Case

A battery was manufactured by a general method, using the positive electrode, the negative electrode, the electrolyte solution, the separator, and a case.

First, a sheet-shaped product was wounded that was obtained by layering the positive electrode and the negative electrode with the separator disposed therebetween. Next, the wound electrode assembly was disposed in a case main body of the case, or an aluminum-made prismatic container case. Subsequently, the positive electrode and the negative electrode were electrically connected to two external terminals, respectively. Further, a cover plate was attached to the case main body. The electrolyte solution was injected into the case through an electrolyte solution filling opening formed on the cover plate of the case. Last, the electrolyte solution filling opening of the case was plugged to seal the case.

Examples 2 to 11

A lithium ion secondary battery was manufactured similarly to Example 1 except that the positive electrode was prepared to give constitution indicated in Table 1. The surface roughness of the conductive layer was adjusted to a predetermined surface roughness, for example, by changing the coating conditions with the gravure coater. In the examples, positive active materials were used that each had an average primary particle diameter indicated in Table 1.

Comparative Examples 1 to 8

A lithium ion secondary battery was manufactured similarly to Example 1 except that the positive electrode was prepared to give constitution indicated in Table 1.

<Average Primary Particle Diameter of Active Material in Positive Active Material Layer>

A manufactured battery is discharged at 2 V and then disassembled in a dry atmosphere. The positive electrode 11 was extracted, washed with dimethyl carbonate, and then subjected to vacuum drying for two hours or more. The positive active material layer 112 was scraped from the positive electrode 11, and the scraped powder was measured for the average particle diameter, using an image observed with a scanning electron microscope (SEM). In the image observed with the scanning electron microscope, the particle diameter was measured for each of randomly selected at least 20 primary particles (primary particles that constitute secondary particles) of the active material. In the measurement of the particle diameter, a primary particle as a measurement target was surrounded by a minimum rectangle capable of surrounding the primary particle and the average value of long sides and short sides of the rectangle was determined to be a particle diameter of the primary particle. An average value was calculated from measured particle diameters and the calculated average value was determined to be the average primary particle diameter. Used as the image for observation was an image at 20000-fold magnification.

<Average Secondary Particle Diameter of Active Material in Positive Active Material Layer>

The average secondary particle diameter was measured similarly to the measurement of the average primary particle diameter. Used as the image for observation was an image at 2000-fold magnification, and a peripheral edge of each secondary particle was determined (recognized) by visual inspection.

<Surface Roughness Ra of Conductive Layer>

A battery was discharged such that the potential of the negative electrode in the battery became 1.0 V or more, and then disassembled in a dry atmosphere. Then, the positive electrode was extracted and the surface roughness Ra was measured at a portion of the conductive layer where the conductive layer does not overlap with the positive active material layer. The surface roughness was measured using a commercially available laser microscope (equipment name "VK-8510" manufactured by KEYENCE CORPORATION) in accordance with JIS B0601: 2013. The detail of the measurement conditions is as follows.

Measurement region (area): 149 μm×112 μm (16688 μm$^2$)
Measurement pitch: 0.1 μm <Evaluation of Power of Battery after High Temperature Cycle Test (Resistance Increase Rate)>

The power of each of the batteries was evaluated by results of measuring direct current resistance (DCR) before and after repetitive charge-discharge test (cycle test) for 3000 h.

Cycle Test:

The SOC (state of charge) of the battery was set at 50% and then the charge-discharge was repeated between a SOC of 15% and 85% while the temperature was set at 55° C. The current value was set at 8 C.

DCR Measurement:

The temperature of each of the batteries was set at 25° C., and then the battery was charged to a SOC of 55%. Discharge was performed at a current value of 12 C for 10 seconds and the voltage at the first second was read. Similarly, discharge was performed at a current value of 18 C, 24 C, 30 C, and 40 C for 10 seconds while the battery was kept at a SOC of 55%, and the voltage was read at each current value. An I-V plot was made with the obtained five points and the DCR was derived from its inclination.

TABLE 1

|  | Type of active material | Average primary particle diameter of active material/μm | Average secondary particle diameter of active material/μm | Density of active material layer/ g · cm$^{-3}$ | Mass per unit area of conductive layer/g · cm$^{-2}$ | Surface roughness Ra of conductive layer Ra/μm | DCR increase rate from before to after cycle test/% |
| --- | --- | --- | --- | --- | --- | --- | --- |
| Example 1 | LiNi$_{1/3}$Co$_{1/3}$Mn$_{1/3}$O$_2$ | 0.5 | 3.1 | 2.53 | 0.3 | 0.35 | −0.5 |
| Example 2 | LiNi$_{1/3}$Co$_{1/3}$Mn$_{1/3}$O$_2$ | 0.6 | 3.8 | 2.53 | 0.3 | 0.35 | −1.4 |
| Example 3 | LiNi$_{1/3}$Co$_{1/3}$Mn$_{1/3}$O$_2$ | 0.6 | 3.8 | 2.53 | 0.16 | 0.20 | −1.1 |
| Example 4 | LiNi$_{1/3}$Co$_{1/3}$Mn$_{1/3}$O$_2$ | 0.6 | 3.8 | 2.53 | 0.6 | 0.45 | −1.5 |
| Example 5 | LiNi$_{1/3}$Co$_{1/3}$Mn$_{1/3}$O$_2$ | 0.8 | 4.2 | 2.53 | 0.3 | 0.35 | −0.5 |
| Example 6 | LiNi$_{1/3}$Co$_{1/3}$Mn$_{1/3}$O$_2$ | 1.0 | 4.6 | 2.53 | 0.3 | 0.35 | 0.1 |
| Example 7 | LiNi$_{1/3}$Co$_{1/3}$Mn$_{1/3}$O$_2$ | 1.2 | 5.8 | 2.53 | 0.3 | 0.35 | −0.3 |
| Example 8 | LiNi$_{1/2}$Co$_{1/5}$Mn$_{3/10}$O$_2$ | 0.8 | 4.6 | 2.53 | 0.3 | 0.35 | −0.5 |
| Example 9 | LiNi$_{1/2}$Co$_{3/10}$Mn$_{1/5}$O$_2$ | 0.8 | 4.8 | 2.53 | 0.3 | 0.35 | −1.0 |
| Example 10 | LiNi$_{3/5}$Co$_{1/5}$Mn$_{1/5}$O$_2$ | 1.0 | 4.9 | 2.53 | 0.3 | 0.35 | −0.8 |
| Example 11 | LiNi$_{3/5}$Co$_{1/5}$Mn$_{1/5}$O$_2$ | 0.7 | 4.0 | 2.53 | 0.3 | 0.35 | −1.0 |
| Example 12 | LiNi$_{1/3}$Co$_{1/3}$Mn$_{1/3}$O$_2$ | 0.5 | 3.1 | 2.76 | 0.3 | 0.35 | 1.2 |
| Example 13 | LiNi$_{1/3}$Co$_{1/3}$Mn$_{1/3}$O$_2$ | 0.5 | 3.1 | 1.67 | 0.3 | 0.35 | 1.9 |
| Comparative Example 1 | LiNi$_{1/3}$Co$_{1/3}$Mn$_{1/3}$O$_2$ | 0.6 | 3.8 | 2.53 | 0.1 | 0.16 | 8.6 |
| Comparative Example 2 | LiNi$_{1/3}$Co$_{1/3}$Mn$_{1/3}$O$_2$ | 0.6 | 3.8 | 2.53 | 1.4 | 0.68 | 5.1 |
| Comparative Example 3 | LiNi$_{1/3}$Co$_{1/3}$Mn$_{1/3}$O$_2$ | 0.6 | 3.8 | 2.53 | 2.0 | 0.90 | 5.2 |
| Comparative Example 4 | LiNi$_{1/3}$Co$_{1/3}$Mn$_{1/3}$O$_2$ | 0.6 | 3.8 | 2.53 | 0 (None) | 0.07 (Al foil) | 10.1 |

TABLE 1-continued

| | Type of active material | Average primary particle diameter of active material/μm | Average secondary particle diameter of active material/μm | Density of active material layer/ g·cm−3 | Mass per unit area of conductive layer/g·cm−2 | Surface roughness Ra of conductive layer Ra/μm | DCR increase rate from before to after cycle test/% |
|---|---|---|---|---|---|---|---|
| Comparative Example 5 | $LiNi_{1/3}Co_{1/3}Mn_{1/3}O_2$ | 1.2 | 6.2 | 2.53 | 0.3 | 0.35 | 10.5 |
| Comparative Example 6 | $LiNi_{1/3}Co_{1/3}Mn_{1/3}O_2$ | 1.2 | 8.0 | 2.53 | 0.3 | 0.35 | 12.3 |
| Comparative Example 7 | Carbon coat $LiFePO_4$ | 0.1 | 0.8 | 2.53 | 0.3 | 0.35 | 6.5 |
| Comparative Example 8 | $LiNi_{1/3}Co_{1/3}Mn_{1/3}O_2$ | 0.6 | 3.8 | 1.50 | 0.3 | 0.35 | 9.5 |
| Comparative Example 9 | $LiNi_{1/3}Co_{1/3}Mn_{1/3}O_2$ | 0.5 | 3.1 | 2.93 | 0.3 | 0.35 | 4.5 |
| Comparative Example 10 | $LiNi_{1/3}Co_{1/3}Mn_{1/3}O_2$ | 0.5 | 3.1 | 1.51 | 0.3 | 0.35 | 5.4 |

As is understood from Table 1, in the batteries of the examples, a decrease in power was sufficiently suppressed that was to be caused by repetitive charge-discharge in a high-temperature environment. On the other hand, in the batteries of the comparative examples, a decrease in power was not always sufficiently suppressed that was caused by repetitive charge-discharge in a high-temperature environment.

DESCRIPTION OF REFERENCE SIGNS

1: Energy storage device (nonaqueous electrolyte secondary battery)
2: Electrode assembly
26: Non-coated layered portion
3: Case
31: Case main body
32: Cover plate
4: Separator
5: Current collector
50: Clip member
6: Insulating cover
7: External terminal
71: Surface
11: Positive electrode
111: Metal foil of positive electrode (positive substrate)
112: Positive active material layer
113: Conductive layer
12: Negative electrode
121: Metal foil of negative electrode (negative substrate)
122: Negative active material layer
91: Bus bar member
100: Energy storage apparatus

The invention claimed is:

1. An energy storage device, comprising:
an electrode which includes: an active material layer including a particulate active material; and a conductive layer layered on the active material layer and including a conduction aid,
wherein an average secondary particle diameter of the active material is 2.5 μm or more and 6.0 μm or less,
wherein a surface roughness Ra of the conductive layer on a side on the active material layer is 0.17 μm or more and 0.50 μm or less,
wherein a density of the active material layer is 1.6 g/cm³ or more and 2.8 g/cm³ or less, and
wherein a mass per unit area of the conductive layer is 0.1 g/m² or more and 1.0 g/m² or less.

2. The energy storage device according to claim 1, wherein the conductive layer includes the conduction aid in amount of 30% or more and 70% or less.

3. The energy storage device according to claim 1, wherein a particle diameter of the conduction aid is 20 nm or more and 40 nm or less.

4. The energy storage device according to claim 1, wherein the active material layer and the conductive layer contain a same solvent.

5. The energy storage device according to claim 1, wherein the conductive layer contains hydroxyalkylchitosan.

6. A method for manufacturing an energy storage device, the method comprising:
preparing an electrode by layering an active material layer including a particulate active material and a conductive layer including a conduction aid,
wherein an average secondary particle diameter of the active material is 2.5 μm or more and 6.0 μm or less,
wherein a surface roughness Ra of the conductive layer on a side on the active material layer is set at 0.17 μm or more and 0.50 μm or less,
wherein a density of the active material layer is set at 1.6 g/cm³ or more and 2.8 g/cm³ or less, and
wherein a mass per unit area of the conductive layer is 0.1 g/m² or more and 1.0 g/m² or less.

* * * * *